(12) United States Patent
Son et al.

(10) Patent No.: US 11,574,198 B2
(45) Date of Patent: Feb. 7, 2023

(54) APPARATUS AND METHOD WITH NEURAL NETWORK IMPLEMENTATION OF DOMAIN ADAPTATION

(71) Applicant: Samsung Electronics Co., Ltd., Suwon-si (KR)

(72) Inventors: Minjung Son, Suwon-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 16/911,784

(22) Filed: Jun. 25, 2020

(65) Prior Publication Data

US 2021/0182687 A1 Jun. 17, 2021

(30) Foreign Application Priority Data

Dec. 12, 2019 (KR) .......................... 10-2019-0165774

(51) Int. Cl.
*G06N 3/08* (2006.01)
*G06K 9/62* (2022.01)

(52) U.S. Cl.
CPC ........... *G06N 3/084* (2013.01); *G06K 9/6201* (2013.01); *G06K 9/6232* (2013.01)

(58) Field of Classification Search
CPC ..... G06N 3/084; G06K 9/6201; G06K 9/6232
See application file for complete search history.

(56) References Cited

U.S. PATENT DOCUMENTS

| | | | |
|---|---|---|---|
| 9,916,542 B2 | 3/2018 | Chidlovskii et al. | |
| 10,068,171 B2 | 9/2018 | Wshah et al. | |
| 10,318,889 B2 | 6/2019 | Xu | |
| 2014/0067361 A1 | 3/2014 | Nikoulina et al. | |
| 2016/0328613 A1 | 11/2016 | Gaidon et al. | |
| 2018/0068463 A1* | 3/2018 | Risser | G06T 7/45 |
| 2019/0065853 A1 | 2/2019 | Sohn et al. | |
| 2019/0114545 A1* | 4/2019 | Lee | G06N 3/08 |
| 2019/0147335 A1* | 5/2019 | Wang | G05D 1/0257 |
| | | | 706/20 |
| 2019/0180136 A1* | 6/2019 | Bousmalis | G06K 9/6268 |
| 2021/0012198 A1* | 1/2021 | Zhang | G06K 9/6228 |

(Continued)

FOREIGN PATENT DOCUMENTS

KR 10-2019-0069227 A 6/2019

OTHER PUBLICATIONS

Ganin, et al. "Unsupervised domain adaptation by backpropagation." *International conference on machine learning*. PMLR, 2015. (11 pages in English).

(Continued)

*Primary Examiner* — Santiago Garcia
(74) *Attorney, Agent, or Firm* — NSIP Law

(57) ABSTRACT

A processor-implemented neural network operating method, the operating method comprising obtaining a neural network pre-trained in a source domain and a first style feature of the source domain, extracting a second style feature of a target domain from received input data of the target domain, using the neural network, performing domain adaptation of the input data, by performing style matching of the input data based on the first style feature of the source domain and the second style feature of the target domain, and processing the style-matched input data, using the neural network.

44 Claims, 11 Drawing Sheets

(56) References Cited

U.S. PATENT DOCUMENTS

| | | | |
|---|---|---|---|
| 2021/0019617 A1* | 1/2021 | Bang | G06T 17/00 |
| 2021/0056693 A1* | 2/2021 | Cheng | G06K 9/6259 |
| 2021/0150197 A1* | 5/2021 | Kokkinos | G06K 9/6215 |
| 2021/0271979 A1* | 9/2021 | Othmezouri | G06K 9/6256 |
| 2021/0374506 A1* | 12/2021 | Zhu | G06N 7/005 |

OTHER PUBLICATIONS

Li, et al. "Layer-wise domain correction for unsupervised domain adaptation." *Frontiers of Information Technology & Electronic Engineering* 19.1 (2018): 91-103. (13 pages in English).

Atapour-Abarghouei, et al. "Real-time monocular depth estimation using synthetic data with domain adaptation via image style transfer." *Proceedings of the IEEE Conference on Computer Vision and Pattern Recognition*. 2018. (11 pages in English).

Xu, et al. "Larger norm more transferable: An adaptive feature norm approach for unsupervised domain adaptation." *Proceedings of the IEEE/CVF International Conference on Computer Vision*. 2019. (10 pages in English).

Roy, et al. "Unsupervised Domain Adaptation Using Full-Feature Whitening and Colouring." *International Conference on Image Analysis and Processing*. Springer, Cham, 2019. (12 pages in English).

Rodriguez, et al. "Domain adaptation for object detection via style consistency." *MatchLab Imperial College London*, London, UK (Nov. 22, 2019). (14 pages in English).

Extended European Search Report dated Apr. 16, 2021 in counterpart European Patent Application No. 20201833.9 (14 pages in English).

Dundar, Aysegul et al., "Domain Stylization: A Strong, Simple Baseline for Synthetic to Real Image Domain Adaptation", *arXiv preprint arXiv:1807.09384*, 2018 (pp. 1-10).

Mehrkanoon, Siamak et al., "Shallow and Deep Models for Domain Adaptation problems", *Proceedings ESANN 2018*, 2018 (pp. 291-299).

Gong, Rui et at., "DLOW: Domain Flow for Adaptation and Generalization", *Proceedings of the IEEE Conference on Computer Vision and Pattern Recognition*, 2019 (pp. 2477-2486).

Roy, Subhankar et al., "Unsupervised Domain Adaptation using Feature-Whitening and Consensus Loss", *arXiv:1903.03215*, 2019 (pp. 1-13).

\* cited by examiner

APPARATUS AND METHOD WITH NEURAL NETWORK IMPLEMENTATION OF DOMAIN ADAPTATION

CROSS-REFERENCE TO RELATED APPLICATIONS

This application claims the benefit under 35 USC § 119(a) of Korean Patent Application No. 10-2019-0165774 filed on Dec. 12, 2019 in the Korean Intellectual Property Office, the entire disclosure of which is incorporated herein by reference for all purposes.

BACKGROUND

1. Field

The following description relates to an apparatus and method with neural network implementation of domain adaptation.

2. Description of Related Art

Domain adaptation refers to the adjusting of a neural network, trained for a source domain, to operate efficiently in a target domain, if the source domain has an input and a ground truth and the target domain only has an input. If the target domain is changed during the domain adaptation process, the neural network may have to be trained again to be compatible for a new target domain. Additionally, if a change occurs in a device that is configured to capture an image of the target domain, for example, if a device that is configured to capture an image is changed after the domain adaptation, it may be difficult for the accuracy of the neural network to be maintained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented neural network method includes obtaining a neural network pre-trained in a source domain and a first style feature of the source domain, extracting a second style feature of a target domain from received input data of the target domain, using the neural network, performing domain adaptation of the input data, by performing style matching of the input data based on the first style feature of the source domain and the second style feature of the target domain; and generating an inference result by processing the style-matched input data using the neural network.

The extracting may include extracting style information corresponding to the input data from at least one of a plurality of layers included in the neural network; and determining the second style feature of the domain target based on the style information.

The performing of the domain adaptation may include performing style matching of the style information corresponding to the second style feature of the target domain with the first style feature of the source domain.

The style information may include a mean and a variance of values output from a plurality of nodes included in a corresponding layer.

The performing of the domain adaptation may include performing style matching of the style information to the first style feature of the source domain by adaptive instance normalization (AIN), based on the first style feature of the source domain and the second style feature of the target domain.

The style information may include a mean and a covariance of values output from a plurality of nodes included in a corresponding layer.

The performing of the domain adaptation may include performing the style matching of the style information to the first style feature of the source domain by a whitening and coloring transform (WCT) process, based on the first style feature of the source domain and the second style feature of the target domain.

The performing of the domain adaptation may include determining, in response to a receipt of plural input data including the input data, a representative style feature of second style features extracted from the plurality of received input data; and performing the domain adaptation of the input data, by style matching of the plural input data based on the first style feature of the source domain and the representative style feature.

The extracting of the second style feature may include sampling the received input data, extracting second features corresponding to a plurality of layers included in the neural network by applying the sampled received input data to the neural network; and extracting the second style feature by calculating a second statistical value of the extracted second features.

The first style feature of the source domain may include a first statistical value that is calculated based on first features extracted by applying sampled data of the source domain to the neural network.

The source domain may include a plurality of domains, and the first style feature of the source domain includes a third statistical value that is calculated based on first features extracted by applying batches sampled for each label of the plurality of domains to the neural network.

The neural network may be configured to perform a desired predetermined operation, and the desired predetermined operation comprises any one or any combination of image recognition, speech recognition, biometric signal recognition, and image segmentation.

The received input data may include any one or any combination of speech data, image data, and biometric signal data.

The method may include training the neural network based on one or any combination of speech data, image data, and biometric signal data.

In a general aspect, a processor-implemented neural network method includes obtaining a neural network to be trained in a plurality of domains, extracting a style feature of the first domain from training data of a first domain among the plurality of domains, using the neural network, performing domain adaptation of the training data, by performing style matching of the training data based on a representative style feature corresponding to the plurality of domains and the style feature of the first domain, processing the style-matched training data, using the neural network; and training the neural network and the representative style feature, based on a result of the processing and a ground truth of the training data.

The extracting may include extracting style information corresponding to the training data from at least one of a plurality of layers included in the neural network; and determining the style feature of the first domain based on the style information.

The performing of the domain adaptation may include performing style matching of the style feature of the first domain with the representative style feature.

The representative style feature may include a mean and a variance of values output from a plurality of nodes included in a corresponding layer.

The performing of the domain adaptation may include performing style matching of the style feature of the first domain to the representative style feature by adaptive instance normalization (AIN), based on the representative style feature and the style feature of the first domain.

The extracting of the style feature of the first domain may include extracting features corresponding to a plurality of layers included in the neural network by applying the training data of the first domain to the neural network; and extracting the style feature of the first domain by calculating a statistical value of the features.

The processing of the style-matched training data may include performing a desired predetermined operation of the neural network with the style-matched training data.

The desired predetermined operation may include any one or any combination of image recognition, speech recognition, biometric signal recognition, and image segmentation.

The training may include training the neural network and the representative style feature based on a loss calculated based on the result of the processing and the ground truth of the training data.

The training data may include any one or any combination of speech data, image data, and biometric signal data.

In a general aspect, a neural network apparatus includes a processor configured to extract a second style feature of a target domain from input data of the target domain, using a neural network pre-trained in a source domain, perform domain adaptation of the input data, by style matching of the input data based on a first style feature of the first source domain and the second style feature, and process the style-matched input data, using the neural network.

The processor may be further configured to extract style information corresponding to the input data from at least one of a plurality of layers of the neural network, and determine the second style feature of the target domain based on the style information.

The processor may be further configured to perform style matching of the style information corresponding to the second style feature of the target domain with the first style feature of the source domain.

The style information may include a mean and a variance of values output from a plurality of nodes included in a corresponding layer of the neural network.

The processor may be further configured to perform style matching of the style information to the first style feature of the source domain by adaptive instance normalization (AIN), based on the first style feature of the source domain and the second style feature of the target domain.

The style information may include a mean and a covariance of values output from a plurality of nodes included in a corresponding layer.

The processor may be further configured to perform style matching of the style information to the first style feature of the source domain by whitening and coloring transform (WCT), based on the first style feature of the source domain and the second style feature of the target domain.

The processor may be further configured to determine, in response to receipt of plural input data including the input data, a representative style feature of second style features extracted from the plural input data, and perform the domain adaptation of the plural input data, by style matching of the input data based on the first style feature of the source domain and the representative style feature.

The processor may be further configured to sample the input data, extract second features corresponding to a plurality of layers of the neural network by applying the sampled input data to the neural network, and extract the second style feature by calculating a second statistical value of the second extracted features.

The first style feature of the source domain may include a first statistical value that is calculated based on first features extracted by applying sampled data of the source domain to the neural network.

The source domain may include a plurality of domains the first style feature of the source domain includes a third statistical value that is calculated based on first features extracted by applying batches sampled for each label of the plurality of domains to the neural network.

The neural network may be configured to perform a desired predetermined operation, and the desired predetermined operation includes any one or any combination of image recognition, speech recognition, biometric signal recognition, and image segmentation.

The input data may include any one or any combination of speech data, image data, and biometric signal data.

The apparatus may include an interface configured to receive a first style feature of a source domain and input data of a target domain.

In a general aspect, a processor-implemented neural network method includes extracting a style feature of a predetermined domain from training data using a feature encoder, performing domain adaptation of the training data by performing style matching of the training data based on a representative style feature corresponding to a plurality of domains and the style feature of the predetermined domain; and training the neural network and the representative style feature based on a calculated loss and a ground truth of the training data.

The training data may include one or more of speech data, image data, and biometric signal data.

The method may include performing the style matching of the style feature of the predetermined domain with the representative style feature by adaptive instance normalization (AIN), based on the representative style feature and the style feature of the predetermined domain.

The domain adaptation may be performed without retraining of one or more portions of the neural network.

In a general aspect, a processor-implemented method includes receiving a target domain image, extracting a style feature of the target domain from the received target domain image, matching the extracted style feature of the target domain with a feature of a source domain; and outputting a result of the matching.

The method may include extracting the style feature of the target domain using a neural network that has been pre-trained in the source domain.

The matching may include removing the style feature of the target domain from the target domain image, and adding the style feature of the source domain to the target domain.

Other features and aspects will be apparent from the following detailed description, the drawings, and the claims.

Figure 1:
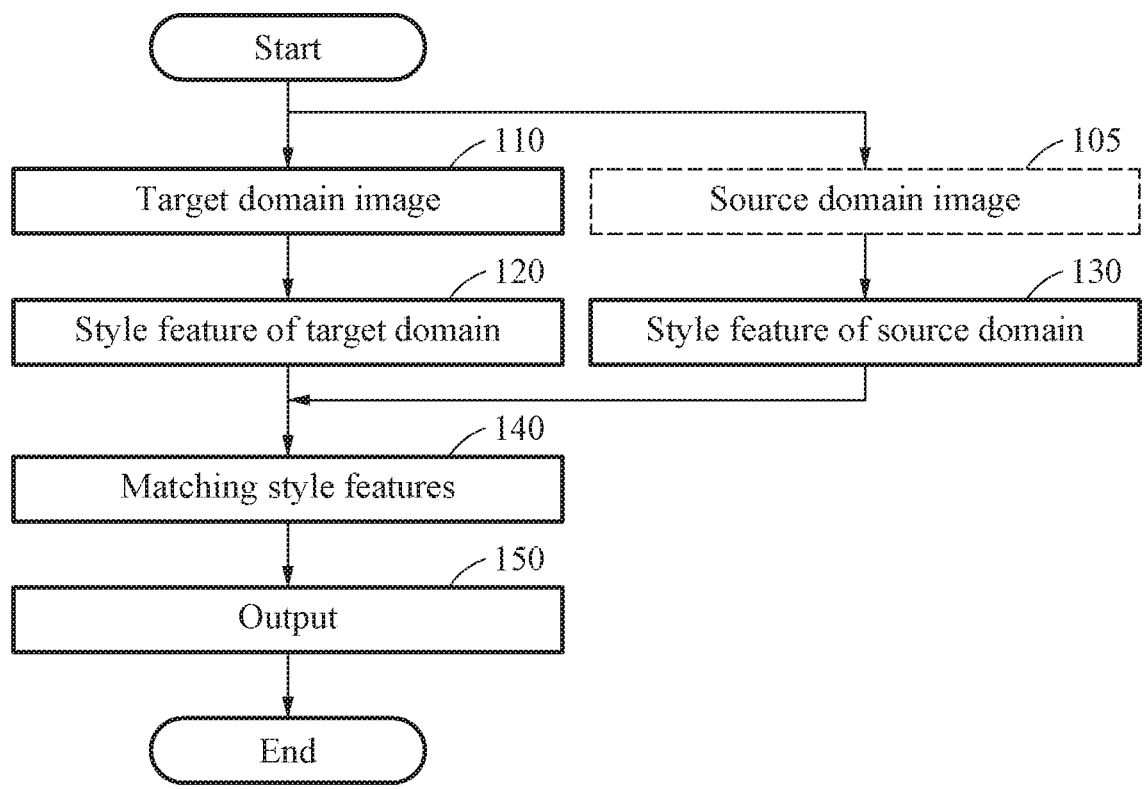
FIG. 1 illustrates an example domain adaptation process, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Unless otherwise defined, all terms including technical and scientific terms used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 illustrates an example domain adaptation process, in accordance with one or more embodiments. The operations in FIG. 1 may be performed in the sequence and manner as shown, or may be performed in a sequence or manner that is different from the sequence and manner shown. One or more blocks of FIG. 1, and combinations of the blocks, can be implemented by special purpose hardware-based computer that perform the specified functions, or combinations of special purpose hardware and computer instructions.

Referring to FIG. 1, a domain adaptation process is illustrated. A domain adaptation process may be a learning technique that adapts a machine-learnt model to newer domains with as few samples as possible, as a non-limiting example. The newer samples associated with the target domain may be "remembered" so that the output generated by current device may be constantly evolving while circumventing any modifications to the base device. Hereinafter, for ease of description, the described examples will be discussed based on image data. However, the examples are not limited thereto. The data of each described domain may be applied to various other types of data, such as, as non-limiting examples, image data, speech data, and biometric signal data.

Referring to FIG. 1, in operation 110, an example apparatus with a neural network domain adaptation (hereinafter, the "operating apparatus") receives a target domain image. Domain adaption may include a generalization of a model from a source domain to a target domain. Typically, the source domain may include a large amount of training data. By learning a mapping between the source domain and the target domain, data from the source domain may be allowed to enrich the available data for training in the target domain.

In operation 120, the operating apparatus may extract a style feature of a target domain from the target domain image. In an example, the operating apparatus may extract the style feature of the target domain using a neural network that has already been trained in a source domain. For example, the operating apparatus may apply the target domain image to the neural network and then extract the style feature of the target domain based on outputs of predetermined layer(s) of the neural network, which will be described further below. In an example, by extracting style features using various target domain images, domain adaptation with respect to various situations and various scenarios may be performed.

In operation 130, the operating apparatus may obtain a style feature of the source domain. The operating apparatus may obtain the style feature of the source domain stored, for example, in a memory 1150 of FIG. 11. The operating apparatus may receive the style feature of the source domain from a source external to the operating apparatus, for example, through a communication interface 1110 of FIG. 11 and store the received style feature of the source domain. In an example, style feature matching may be performed by only using the style feature of the source domain, rather than the entire data of the source domain. Thus, there it may not be necessary to store the entire data of the source domain, thus improving memory efficiency. In an example, the operating apparatus may receive a source domain image from a source external to the operating apparatus, in operation 105, and obtain the style feature of the source domain by directly extracting the style feature from the received source domain image, in operation 130. Herein, the use of the term "may" with respect to an example or embodiment, e.g., as to what an example or embodiment may include or implement, means that at least one example or embodiment exists where such a feature is included or implemented while all examples and embodiments are not limited thereto.

Hereinafter, for ease of description, the style feature of the source domain will be referred to as the "first style feature", and the style feature of the target domain will be referred to as the "second style feature".

In operation 140, the operating apparatus may match the style feature of the target domain extracted in operation 120 and the style feature of the source domain obtained in operation 130. The style matching of the style feature of the target domain and the style feature of the source domain may be performed, for example, by a style feature matching module 450 of FIG. 4. In an example, the style feature matching module 450 may perform style matching by removing the style feature of the target domain from the target domain image, and then adding the style feature of the source domain to the target domain, which will be described further below.

In operation 150, the operating apparatus may output a result of the matching of operation 140. A domain-adapted image that corresponds to the style feature of the source domain may be output in operation 150. The domain-adapted image may be processed by the neural network that has already been trained in the source domain. As described above, the examples may perform domain adaptation without separately training the neural network, by performing domain adaptation (for example, by performing style matching) on the target domain image so that the style feature of the target domain image corresponds to the style feature of the source domain, rather than performing domain adaptation on the neural network that has already been trained in the source domain to correspond to the target domain.

If the style feature of the target domain is extracted by inputting the target domain image into the neural network already trained in the source domain, a resultant image which includes, e.g., as close as possible, the content of the target domain image, and with a style feature corresponding to the style feature of the source domain image, may be generated. In an example, there is provided an extreme example in which the source domain image is an image of a Vincent van Gogh style painting, and the target domain image is an image of a roadway. The operating apparatus may acquire a resultant image which includes content corresponding to content of the image of the roadway, and that content of the image of the roadway may have a unique Vincent van Gogh style by applying the image of the roadway to the neural network that has already been trained in the source domain. In this example, a domain to which data that changes the style feature of the target domain image (for example, the Vincent van Gogh style painting image) belongs is referred to as a "source domain", and a domain to which data to which the style feature is changed belongs is referred to as a "target domain".

The operating apparatus may perform domain adaptation from the target domain image to the source domain by performing the style matching process described above. The domain adaptation corresponds to statistical value matching that makes a feature statistical value of the target domain follow a feature or a feature statistical value of the source domain, with respect to the neural network that has already been trained in the source domain. If the statistical value matching is used, it may not be necessary to perform domain adaptation which trains the neural network again using a ground truth (GT) corresponding to the input of the target domain. The style matching may also be referred to as "statistical value matching" in that the style matching is a process of matching statistical values corresponding to style features of the respective domains.

Additionally, domain generalization may train the neural network by a feature statistical value that does not change depending on a domain, that is, a domain-invariant feature statistical value, and thus domain generalization with respect to multiple domains may also be trained simultaneously. If the neural network trained as described above and a representative style feature are used, it may be implemented in a domain that has never been used for training, and may also be implemented to a single input for which a domain has not been specified.

By updating the neural network through a style feature matching module, the neural network may not have to be trained again with respect to the input data, and thus, the neural network may be implemented in an environment where the operating apparatus has a limited performance, for example, a limited computation power, or an environment where training of the neural network is difficult. The domain adaptation and/or the domain generalization may be utilized for various neural network-based methods in various fields such as, for example, image processing, speech processing, biometric signal processing, and vision, as non-limiting examples.

Example methods may be implemented to perform domain adaptation such that a neural network that has already been trained in a predetermined domain may be appropriate for a new domain. Such, or alternative example methods may also be implemented to simultaneously train multiple domains and perform domain generalization in an unseen domain that has never been used for training.

For example, if a neural network that is configured to perform a predetermined desired operation such as, for example, training-based detection or localization is configured for implementation by a device, and a change in a service environment of the device may occur, or a change in an image detected by the device occurs, the neural network may be updated by performing domain adaptation through collecting the detected image, rather than securing a new ground truth corresponding to the content of the change. Further, with respect to the same training-based neural network implemented by devices in various environments, the performance of the neural network may be improved by performing training for domain generalization by collecting all secured ground truths of various domains.

Figure 2:
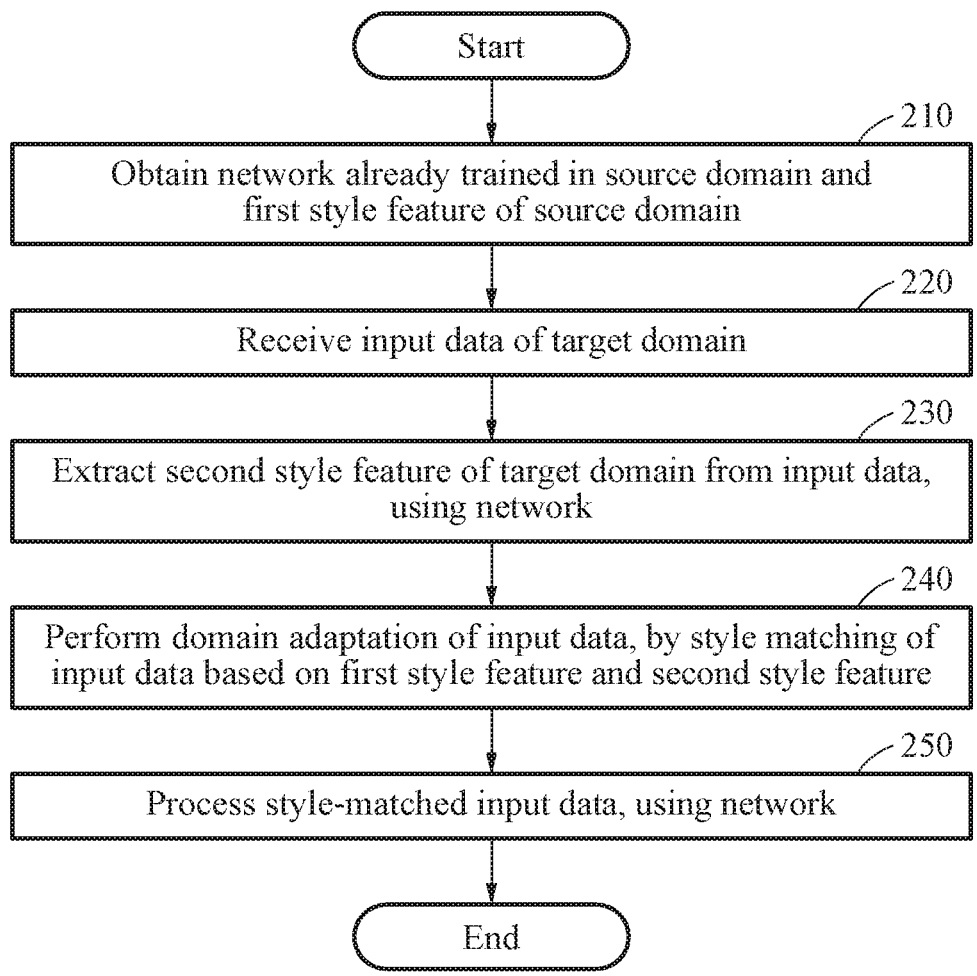
FIG. 2 illustrates an example operating method of a neural network based on domain adaptation, in accordance with one or more embodiments.

FIG. 2 illustrates an example operating method of a neural network based on domain adaptation, in accordance with one or more embodiments. The operations in FIG. 2 may be performed in the sequence and manner as shown, or may be performed in a sequence or manner that is different from the sequence and manner shown. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, an operating apparatus obtains a neural network that has already been trained in a source domain, and a first style feature of the source domain. The neural network is configured to perform a predetermined desired operation, and the desired operation may include, as non-limiting examples, image recognition, speech recognition, biometric signal recognition, visual alignment, and image segmentation. However, the desired operation is not necessarily limited thereto and may include various other operations. The neural network may be, as non-limiting examples, a feature encoder and/or a feature decoder, but is not necessarily limited thereto. An example of a structure of the neural network will be described further below with reference to FIG. 3.

In operation 220, the operating apparatus receives input data of a target domain. The input data may include, as non-limiting examples, speech data, image data, and biometric signal data, but is not necessarily limited thereto. Domain adaptation may be applied to various types of domains and tasks performed in those domains, including as a non-limiting example, automated speech recognition (ASR).

In operation 230, the operating apparatus extracts a second style feature of the target domain from the input data, using the neural network. For example, the operating apparatus samples the input data, and extracts second features corresponding to at least a portion of a plurality of layers included in the neural network by applying the sampled input data to the neural network. The operating apparatus extracts the second style feature of the target domain by calculating a second statistical value of the second features. At least one layer from which the second features are extracted may correspond to at least one layer for extracting the style feature of the source domain.

In an example, the input data may include a plurality of images (or frames). For example, if N target domain images are received on-the-fly as the input data, e.g., as captured by an optical sensor or camera, the operating apparatus may define and use the style feature based on statistical values of the N target domain images.

In operation 230, the operating apparatus extracts style information corresponding to the input data from at least one of the plurality of layers of the neural network. The operating apparatus may determine the second style feature of the target domain based on the extracted style information. For example, the operating apparatus may extract style information from each layer, and may also perform style matching on a layer-by-layer basis. The style information may be extracted from any of the plurality of layers, and style matching is performed on the layer from which the style information is extracted. The style matching, which will be described in greater detail later, may be performed on a layer from which style information is extracted.

In an example, different layer(s) that define a style feature may be applied based on a domain characteristic. For example, if a domain of the input data has a first characteristic, the style feature may be defined using a first layer among the plurality of layers in the neural network. If the domain of the input data has a second characteristic, the style feature is defined using a second layer among the plurality of layers in the neural network.

In an example, initial layers in the neural network may include the plurality of layers that pertain to relative fine-scale information, and deep layers that may pertain to high-level information. If a domain characteristic is known in advance, a style feature may be defined by a suitable layer based on the domain characteristic. When a sensor characteristic is limited to a color, an initial layer may define the style feature. When colors are similar but the higher-level style characteristics differ, it may be more appropriate that the style feature is defined by a deeper layer rather than by the initial layer. If style features differ greatly overall, the style features may be sequentially defined by the initial layer and the one or more deep layers. As described above, the style feature may be applied to a single predetermined layer in the neural network, and may also be applied to multiple layers from the initial layer to the deep layer, and such layers may not necessarily be adjacent to the initial layer, the deep layer, or other applied to layers among non-applied to layers.

In operation 240, the operating apparatus may perform domain adaptation of the input data, by style matching of the input data based on the first style feature of the source domain and the second style feature of the target domain. The first style feature may include a first statistical value calculated based on first features extracted by applying sampled data of the source domain to the neural network.

If the source domain includes a plurality of domains, the first style feature may include a third statistical value calculated based on first features extracted by applying batches sampled for each label of the plurality of domains to the neural network.

The first statistical value and/or the third statistical value may include, as an example, a mean and a variance. The first statistical value and/or the third statistical value may be calculated in advance and stored.

In operation 240, the operating apparatus performs style matching of the style information corresponding to the second style feature of the target domain with the first style feature of the source domain. The operating apparatus performs style matching of the style information with the first style feature of the source domain by, as a non-limiting example, adaptive instance normalization (AIN), based on the first style feature of the source domain and the second style feature of the target domain. In this example, the style information may include a mean and a variance of values output from a plurality of nodes included in a corresponding layer. An example in which the operating apparatus performs the style matching by AIN will be described further below with reference to FIG. 5.

In another example, the operating apparatus may perform style matching of the style information with the first style feature of the source domain by a whitening & coloring transform (WCT) process, based on the first style feature of the source domain and the second style feature of the target domain. In this example, the style information may include, for example, a mean and a covariance of values output from a plurality of nodes included in a corresponding layer. An example in which the operating apparatus performs the style matching by WCT will be described further below with reference to FIG. 6. In an example, the mean and covariance of features may be extracted by inferencing pre-trained neural networks for sampled data.

In an example, the operating apparatus may perform style matching of the style information with the first style feature of the source domain by, as non-limiting examples, Gram matrix matching, histogram matching, and cumulative distribution function (CDF) matching.

In an example, a plurality of input data may be provided. In response to the plurality of input data being provided, the operating apparatus determines a representative style feature of second style features extracted from the plurality of input data. The operating apparatus performs the domain adaptation of the input data by style matching of the input data based on the first style feature and the representative style feature.

In operation 250, the operating apparatus processes the style-matched input data, using the neural network. In a non-limiting example, the operating apparatus may perform image recognition, speech recognition, biometric signal recognition, and image segmentation with respect to the style-matched input data, using a neural network configured to perform a predetermined desired operation. The operating apparatus may correspond to a computing device. For example, the operating apparatus may be, as non-limiting examples, a personal computer (PC), a server, a mobile device, and the like, and may further correspond to, or be an apparatus provided in or as, autonomous vehicles, robotics, smartphones, tablet devices, augmented reality (AR) devices, Internet of Things (IoT) devices, and similar devices, which perform voice recognition, speech recognition, biometric signal recognition, image recognition, and image segmentation by implementing a neural network, but the present disclosure is not limited thereto, and may correspond to various other types of devices.

Figure 3:
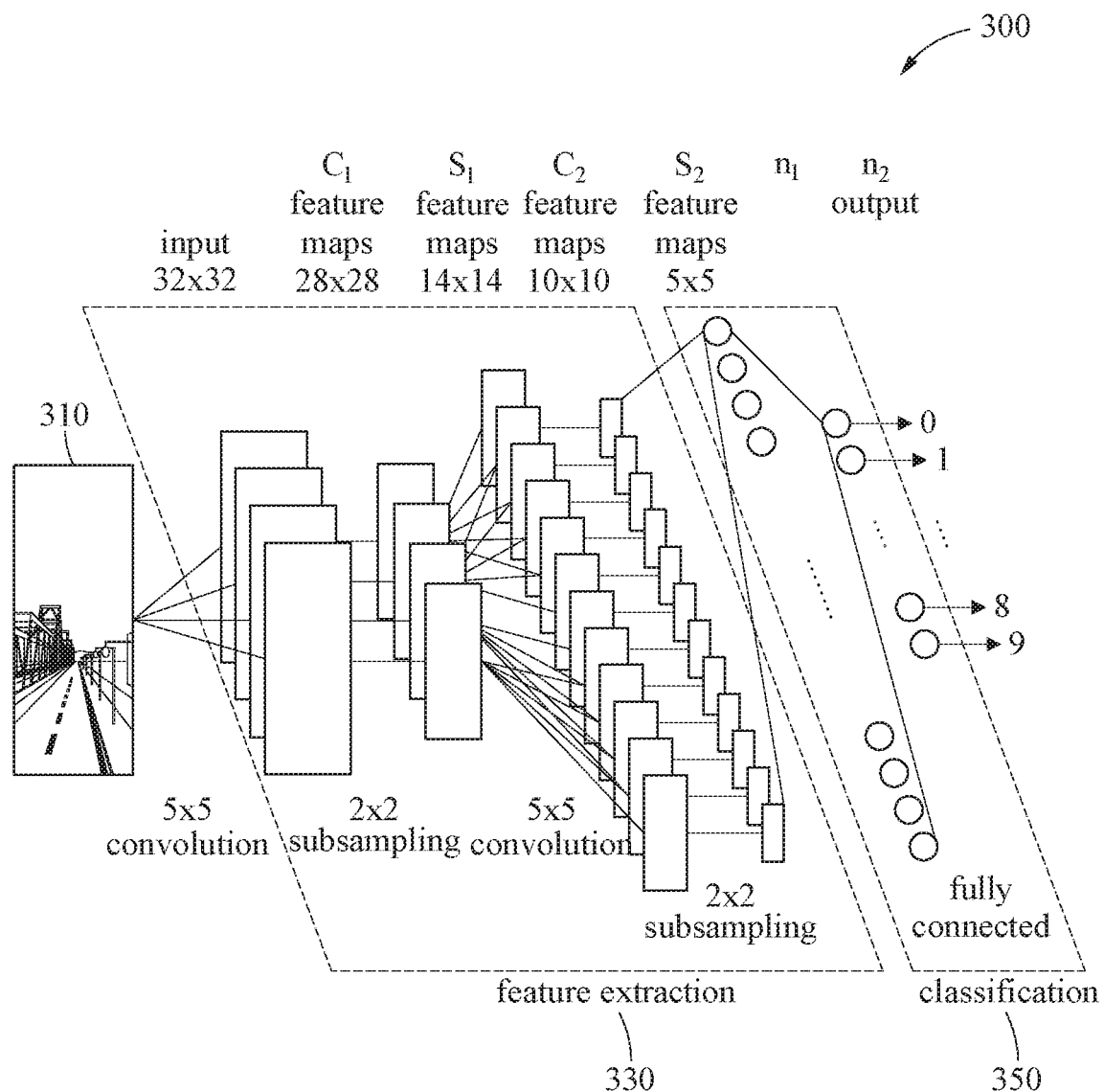
FIG. 3 illustrates an example structure of a neural network, in accordance with one or more embodiments.

FIG. 3 illustrates an example structure of a neural network 300. Referring to FIG. 3, the example neural network may be, as a non-limiting example, a convolutional neural network (CNN) 300 including a plurality of layers. The CNN is a neural network which has at least one convolution layer. A CNN consists of one or more input layers and one or more output layers, as well as multiple hidden layers. The hidden layers of a CNN may consist of convolutional layers, a rectified linear unit (RELU) layer (e.g., activation function), pooling layers, fully connected layers, and normalization layers, as non-limiting examples. Convolutional layers may apply a convolution operation to respectively received input data or activation results from previous layers, and pass the result to a next adjacent layer, for example.

As noted, the neural network 300 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples.

The CNN 300 may include, for example, fully connected layers, and may be trained by data of a source domain. In some examples, when performing semantic segmentation or visual alignment, the CNN 300 may use another neural network that does not include fully connected layers. The CNN model 300 may include a plurality of layers. For example, the CNN model 300 may include an input (initial) layer, a plurality of hidden layers, and an output (deepest) layer. Each of the layers may include a plurality of nodes. Each node is a unit of calculation with an input and an output, and nodes are connected to each other by a "link", or weighted connection or kernel, and nodes connected by such links form relationships between an input node and an output node. The concepts of an input node and an output node are relative, and an arbitrary node in a relationship with the output node with respect to one node may be in a relationship with the input node in a relationship with another node, or vice versa.

For example, if an image 310, which is, for example, data of the source domain is input, the CNN 300 may extract a feature from the image 310 through a feature encoder 330, and determine a class of the extracted feature through a classifier 350.

An operating apparatus may extract a style feature from each layer of the CNN 300, or extract a style feature from one or a portion of the layers. In this example, a feature extracted from one layer of the CNN 300 with respect to the image 310 is referred to as "style information", and a feature extracted by all the layers of the CNN 300 with respect to the image 310, that is, a feature corresponding to the source domain is referred to as a "style feature".

For example, it is assumed that the size of the image 310 input into the CNN 300 is 32×32, and the size of a feature map outputted from a layer set to extract a style feature is 3×3×512 (here, 512 denotes the number of channels). In this example, the operating apparatus may calculate a style feature for each channel.

For example, if the style feature is a mean and a variance, the operating apparatus obtains a total of 1024 values (512 means and 512 variances) by calculating means and variances for the respective channels. The 1024 values calculated as described above correspond to the style feature of the source domain.

In another example, if the style feature is a mean and a covariance, the operating apparatus calculates means and covariances for the respective channels. In this example, the style feature of the source domain includes a (512×512) covariance matrix and 512 means.

If a target domain image is input into the CNN 300, the size (32×32) of the image may vary depending on the size of the target domain image.

Figure 4:
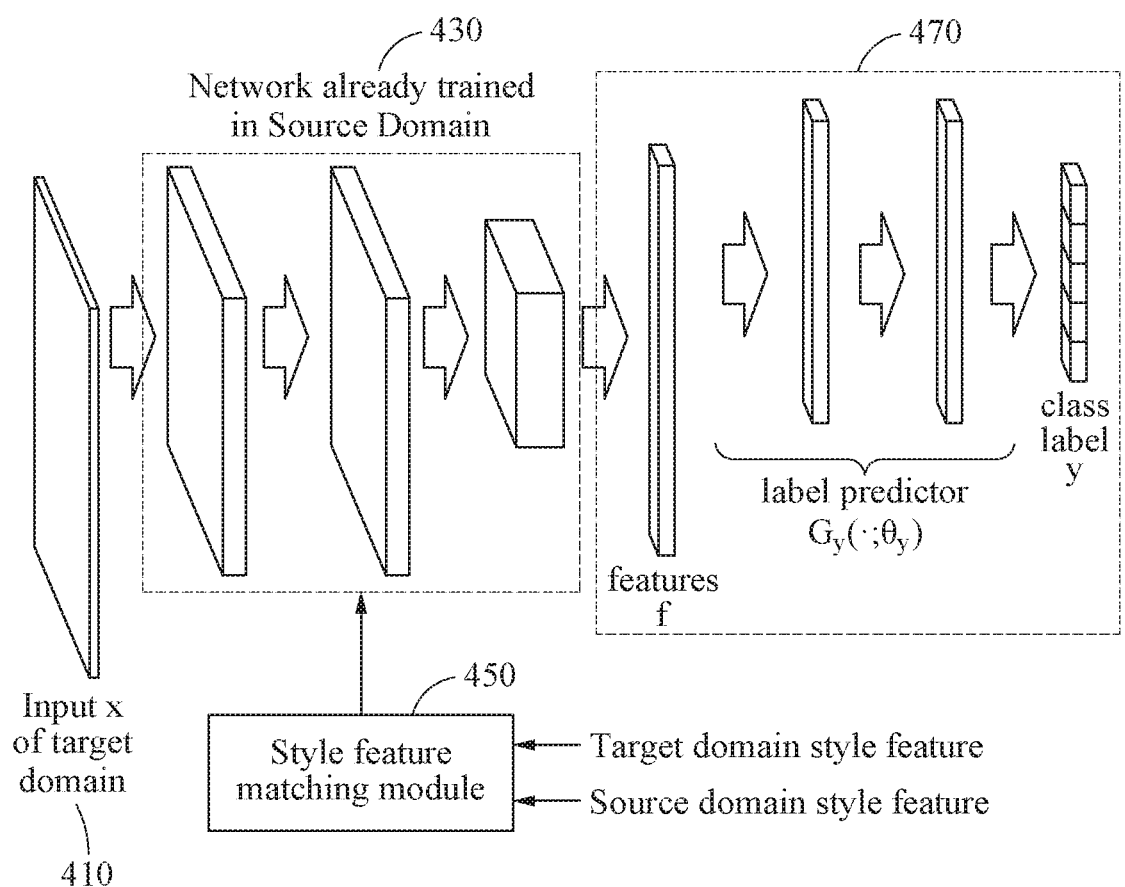
FIG. 4 illustrates an example operating method of a neural network based on domain adaptation, in accordance with one or more embodiments.

FIG. 4 illustrates an example operating method within a neural network based on domain adaptation.

Referring to FIG. 4, an input image X 410 of a target domain, a pre-trained neural network 430 that has already been trained in a source domain, the style feature matching module 450, and a classifier 470 are illustrated.

In an example, if the input image X 410 of the target domain is input, an operating apparatus extracts a second style feature of the target domain from the input image X 410 by inputting the input image X 410 into the neural network 430 already trained in the source domain. The neural network 430 may be, for example, a feature encoder configured to extract a feature from an image or encode a feature of an image. In response to a plurality of input images X 410 being provided, the operating apparatus may extract second style features corresponding to the respective input images by inputting the plurality of input images into the neural network 430. The operating apparatus may determine a mean value of the second style features to be the style feature of the target domain.

The style feature matching module 450 may match the style feature of the target domain (Target Domain Style Feature) to the style feature of the source domain (Source Domain Style Feature) at the rear of the layer from which the style feature of the input image X 410 is extracted, e.g., the respective convolution or activation outputs of this layer, among the layers of the neural network 430.

The classifier 470 determines a class label of an object included in a result image matched to the style feature of the source domain by the style feature matching module 450.

Figure 5:
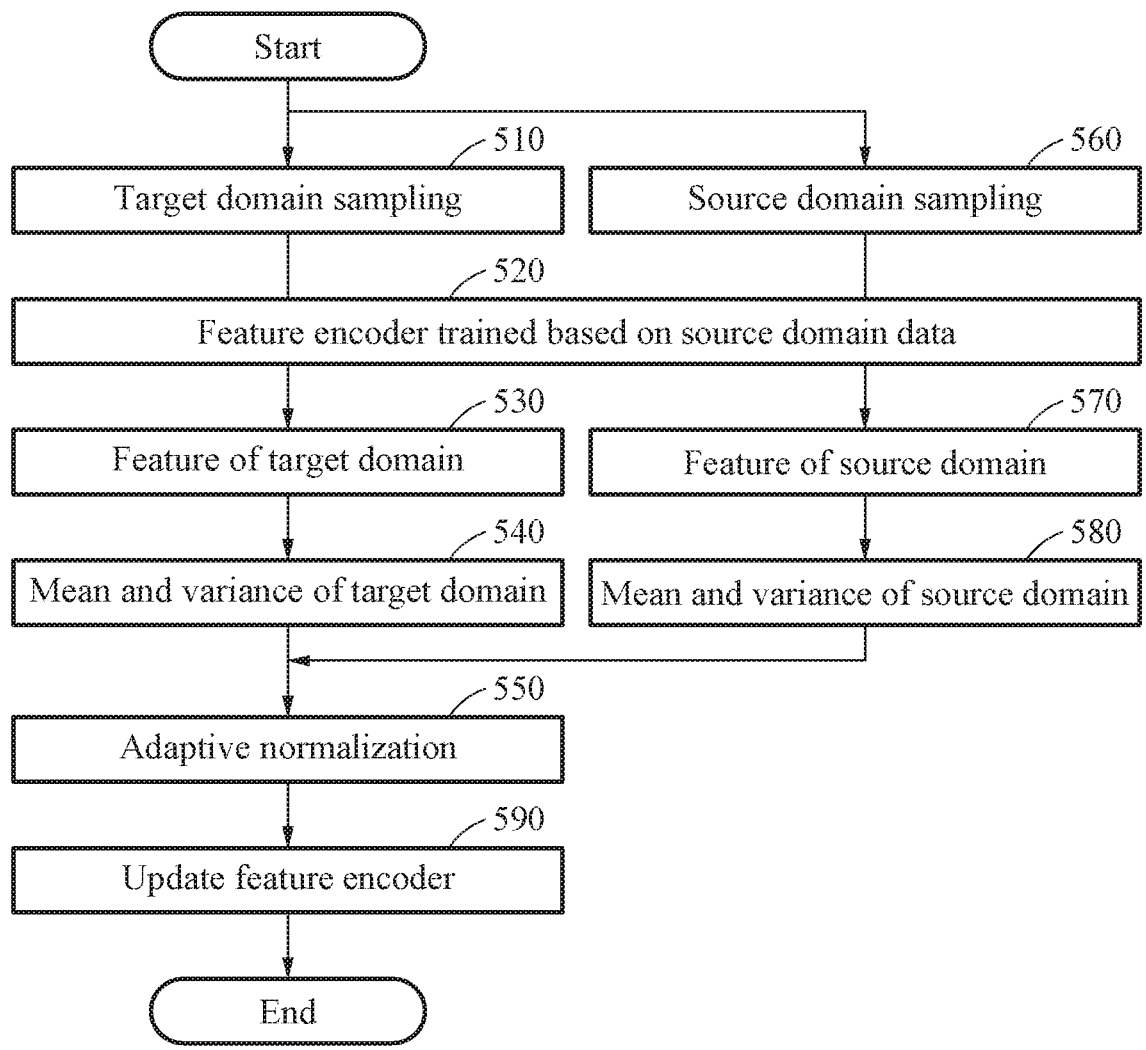
FIGS. 5 and 6 illustrate examples domain adaptation process, in accordance with one or more embodiments.

FIG. 5 illustrates an example domain adaptation process. The operations in FIG. 5 may be performed in the sequence and manner as shown, or may be performed in a sequence or manner that is different from the sequence and manner shown. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, a process of performing domain adaptation using a mean and a variance as a style feature is illustrated.

In an example, if a source domain includes a pre-trained neural network, applying the pre-trained neural network to data of a target domain may not achieve an acceptable result. Thus, by updating a portion (for example, a feature encoder) of the pre-trained neural network in the source domain, the pre-trained neural network in the source domain may be adapted to achieve acceptable performance even with respect to the data of the target domain. Hereinafter, for ease of description, an example in which a portion of the neural network includes a feature encoder will be described as an example. However, examples are not limited thereto. A portion of the neural network may be in various forms, such as a feature decoder or an encoder-decoder.

In operation 510, an operating apparatus samples N items of data for each domain, among data of a target domain. In operation 560, the operating apparatus samples N items of data, among data of a source domain. That is, the operating apparatus randomly samples N items of data, among data of the source domain and the target domain.

In operation 520, the operating apparatus inputs the N items of target domain data sampled in operation 510 into a feature encoder already trained in the source domain and inputs the N items of source domain data sampled in operation 560 into the feature encoder already trained in the source domain. The operating apparatus extracts feature(s) of the target domain (the "second feature(s)") in operation 530, and extracts feature(s) of the source domain (the "first feature(s)") in operation 570. For example, if a neural network includes a plurality of layers, the number of second features and the number of first features may each be equal to the number of the plurality of layers. In this example, features of each domain may not necessarily be those output from a final layer of the feature encoder, and may be features output from an intermediate layer of the feature encoder.

In operation 540, the operating apparatus calculates a statistical value (for example, a mean and a variance) of the features of the target domain. In operation 580, the operating apparatus calculates a statistical value (for example, a mean and a variance) from the features of the source domain.

Hereinafter, for ease of description, the statistical value of the first features of the source domain will be referred to as the "first statistical value" or the "first style feature", and the statistical value of the second features of the target domain will be referred to as the "second statistical value" or the "second style feature".

In operation 550, the operating apparatus performs adaptive normalization with respect to the input data of the target domain, by style matching based on the first style feature and the second style feature.

For example, if the data of the source domain and the data of the target domain are each a single image, the operating apparatus performs style matching of a feature x of the target domain to a feature y of the source domain using a mean p and a variance $G^2$ of each of the source domain and the target domain. In operation 550, the operating apparatus performs the style matching, for example, by AIN expressed by the example Equation 1 below.

$$AdaIN(x,y) = \sigma(y)\left(\frac{x - \mu(x)}{\sigma(x)}\right) + \mu(y) \qquad \text{Equation 1}$$

In Equation 1, $\sigma(x)$ denotes a standard deviation of the target domain, and $\sigma(y)$ denotes a standard deviation of the source domain. $\mu(x)$ denotes a mean of the target domain, and $\mu(y)$ denotes a means of the source domain.

Equation 1 may correspond to a process of performing style matching to the source domain by shifting the feature x of the target domain by the mean $\mu(y)$ of the source domain and scaling the feature x of the target domain by the standard deviation $\sigma(y)$ of the source domain.

The operating apparatus extends an example in which the data is a single image to a domain and thereby applies the same to the N items of data of each of the source domain and the target domain. The operating apparatus obtains a mean value with respect to the mean and the variance of the N items of data and uses the mean value as the means and the variance of each of the target domain and the source domain. Matching, which uses the mean and the variance with respect to the style features of each domain as described above, may be defined as "adaptive normalization".

In operation 590, the operating apparatus updates the feature encoder based on a result of performing the adaptive normalization of operation 550. The operating apparatus updates the feature encoder by adding a layer for adaptive normalization. In another example, if a convolutional layer of the feature encoder is followed by a normalization layer for performing normalization such as, for example, batch normalization, the operating apparatus updates the feature encoder by updating parameters of the normalization layer.

The operating apparatus may iteratively perform the adaptive normalization, in a manner of performing the entire adaptive normalization process using a feature of first data of the target domain and then sequentially performing the adaptive normalization process again using a feature of subsequent data. In this example, a sampled portion of the data of the source domain and the data of the target domain may be used, and thus a ground truth (GT) corresponding to each input may not be necessary.

Figure 6:
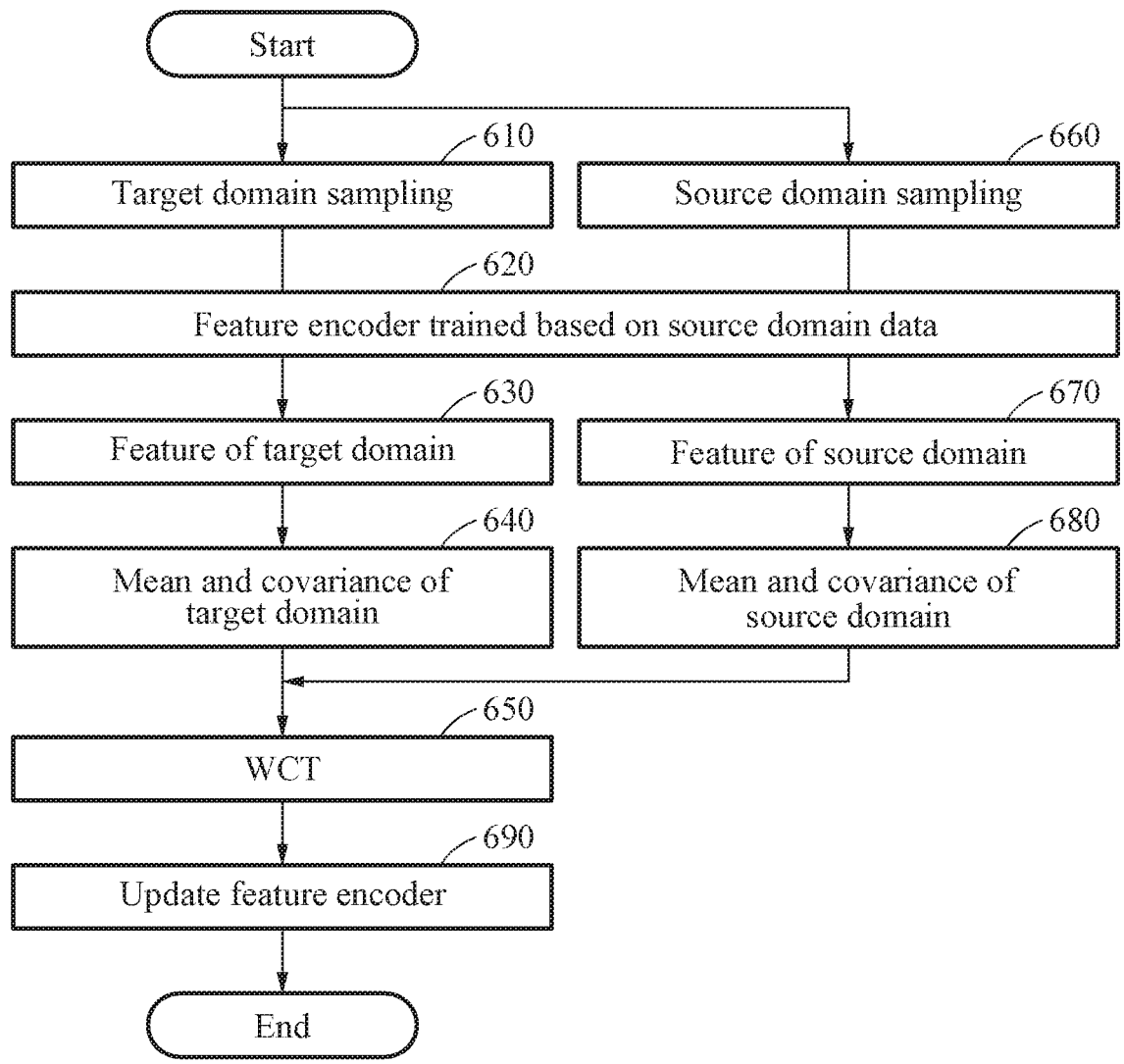

FIG. 6 illustrates an example domain adaptation process, in accordance with one or more embodiments. The operations in FIG. 6 may be performed in the sequence and manner as shown, or may be performed in a sequence or manner that is different from the sequence and manner shown. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, an example process of performing domain adaptation using a mean and a covariance as a style feature is illustrated.

Operations 610 to 630, 660, and 670 of FIG. 6 may be the same, or may be similarly implemented, as operations 510 to 530, 560, and 570 of FIG. 5, and thus reference may be made to the description thereof, for respective understandings of operations 610 to 630, 660, and 670.

In operation 640, an operating apparatus calculates a statistical value (for example, a mean and a covariance) of feature(s) of a target domain, extracted in operation 630, based on the features of the target domain. In operation 680, the operating apparatus calculates a statistical value (for example, a mean and a covariance) of feature(s) of a source domain, extracted in operation 670, based on the features of the source domain.

In operation 650, the operating apparatus performs WCT with respect to input data of the target domain, by styling matching based on a first style feature of the source domain and a second style feature of the target domain.

For example, if source data and the target data are each a single image, style matching of a feature of the target domain to a feature of the source domain through WCT is performed as follows.

The operating apparatus may obtain a covariance matrix $f_c f_c^T$ of each of result values $f_c$ having zero mean that makes a mean zero by subtracting a mean $\mu_c$ of features of a target domain c from the features of the target domain c.

The operating apparatus obtains a diagonal matrix $D_c$ including eigenvalues and an orthogonal matrix $E_c$ including eigenvectors corresponding to the diagonal matrix through eigen decomposition of the covariance matrix $f_c f_c^T$.

With respect to the covariance matrix $f_c f_c^T$ corresponding to the features of the target domain c, the eigen decomposition is performed, as expressed by the example Equation 2 below.

$$f_c f_c^T = E_c D_c E_c^T \qquad \text{Equation 2:}$$

The relationship of the example Equation 2 may similarly apply to the features of the source domain s. The operating apparatus may obtain a covariance matrix $f_s f_s^T$ of each of result values $f_s$ having zero mean that makes a mean zero by subtracting a mean $\mu_s$ of the features of the source domain s from the features of the source domain s.

The operating apparatus performs whitening on the features of the target domain by the example Equation 3 below and consequently, obtains whitened uncorrelated target features $\hat{f}_c$ that satisfy the example Equation 4.

$$\hat{f}_c = E_c D_c^{-1/2} E_c^T f_c \qquad \text{Equation 3:}$$

$$\hat{f}_c \hat{f}_c^T = I \qquad \text{Equation 4:}$$

The operating apparatus performs coloring as expressed by the example Equation 5 below, such that the whitened features $\hat{f}_c$ of the target domain follow the covariance of the features of the source domain.

$$\hat{f}_{cs} = E_s D_s^{1/2} E_s^T \hat{f}_c \qquad \text{Equation 5:}$$

Features $\hat{f}_{cs}$ obtained as a result of the coloring satisfy the example Equation 6 below through covariance matching.

$$\hat{f}_{cs} \hat{f}_{cs}^T = f_s f_s^T \qquad \text{Equation 6:}$$

The operating apparatus may perform style matching using a mean and a covariance by adding the mean $\mu_s$ of the features of the source domain to a result of the covariance matching so as to follow the features of the source domain.

The operating apparatus may apply to an example in which the data is a single image to a domain and thereby applies the same to N items of data of each of the source domain and the target domain. The operating apparatus may obtain a mean and a covariance with respect to the N items of data, and use the mean and the covariance as a mean and a covariance of each of the target domain and the source domain. Matching which uses the mean and the covariance with respect to the style features of each domain as described above may be defined as "WCT".

In operation 690, the operating apparatus may update a feature encoder based on a result of performing the WCT of operation 650. The operating apparatus updates the feature encoder by adding a layer for WCT. In another example, if a convolutional layer of the feature encoder is followed by the layer for WCT, the operating apparatus updates the feature encoder by updating parameters of the layer for WCT.

The operating apparatus may iteratively perform the WCT, by performing the entire WCT process using a feature of first data of the target domain and then recursively performing the WCT process again using a feature of subsequent data. In this example, a sampled portion of the data of the source domain and the data of the target domain may be used, and thus a ground truth (GT) corresponding to each input may not be necessary.

Figure 7:
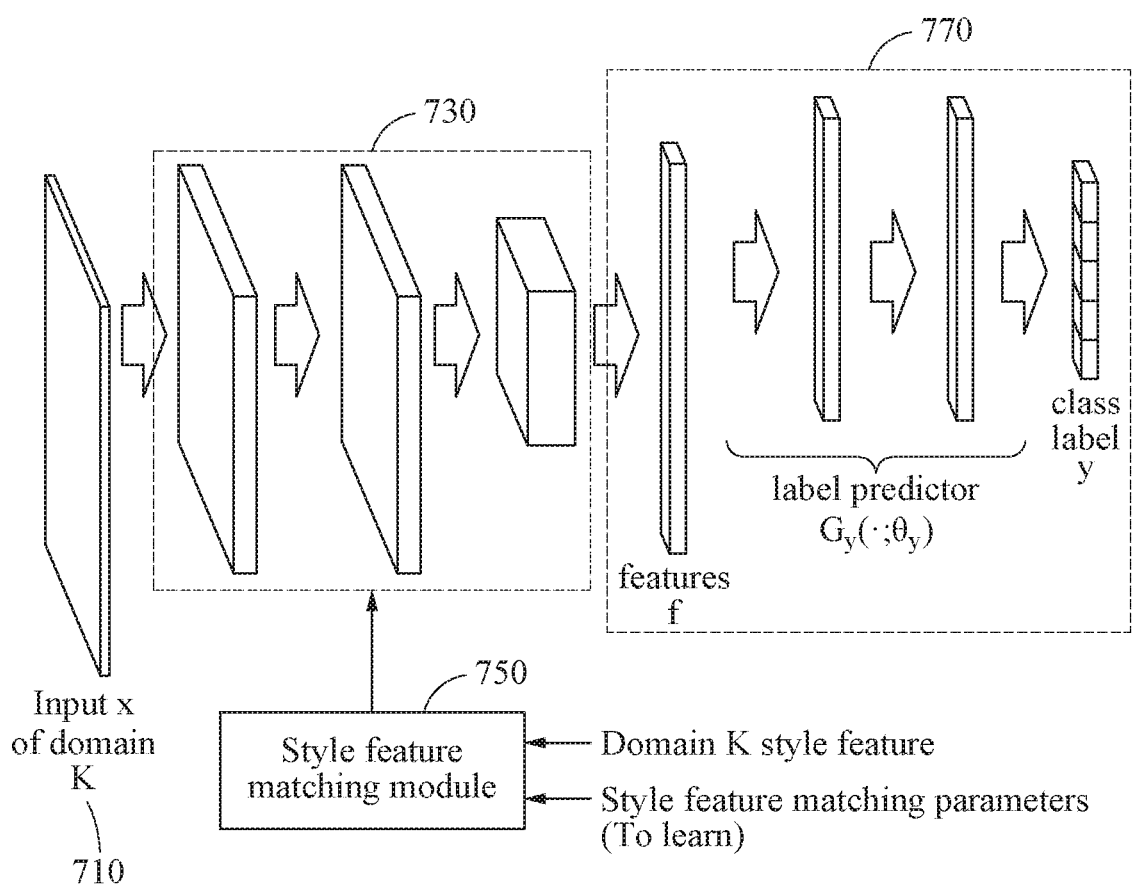
FIG. 7 illustrates an example operating method of a neural network for domain generalization, in accordance with one or more embodiments.

FIG. 7 illustrates an example of an operating method with a neural network for domain generalization, in accordance with one or more embodiments.

Referring to FIG. 7, an input image X 710 of a domain K, a neural network 730 to be trained, a style feature matching module 750, and a classifier 770 are illustrated.

In an example, if the input image X 710 of the domain K is input, an operating apparatus extracts a style feature of the domain K by inputting the input image X 710 into the neural network 730. The neural network 730 may define a style feature for each domain as a mean of style features for each domain.

The style feature matching module 750 matches the style feature of the domain K according to style feature matching parameters, in a layer from which the style feature of the input image X 710 is extracted, among the layers of the neural network 730. In the example of FIG. 7, the style feature matching parameters act as the style feature of the source domain. In a non-limiting example, the style feature matching module 750 may perform style matching based on AIN as described above.

The classifier 770 determines a class label of an object included in a result image matched to the style feature of the domain K by the style feature matching module 750.

The operating apparatus may train parameters (for example, connection, kernels) of the neural network 730 and the style feature matching parameters of the style feature matching module 750, which will be described further below. For example, in a training process, the parameters of the neural network 730 and the style feature matching parameters of the style feature matching module 750 are trained based on back-propagation learning which is based on a loss between a classification result and a ground truth.

Figure 8:
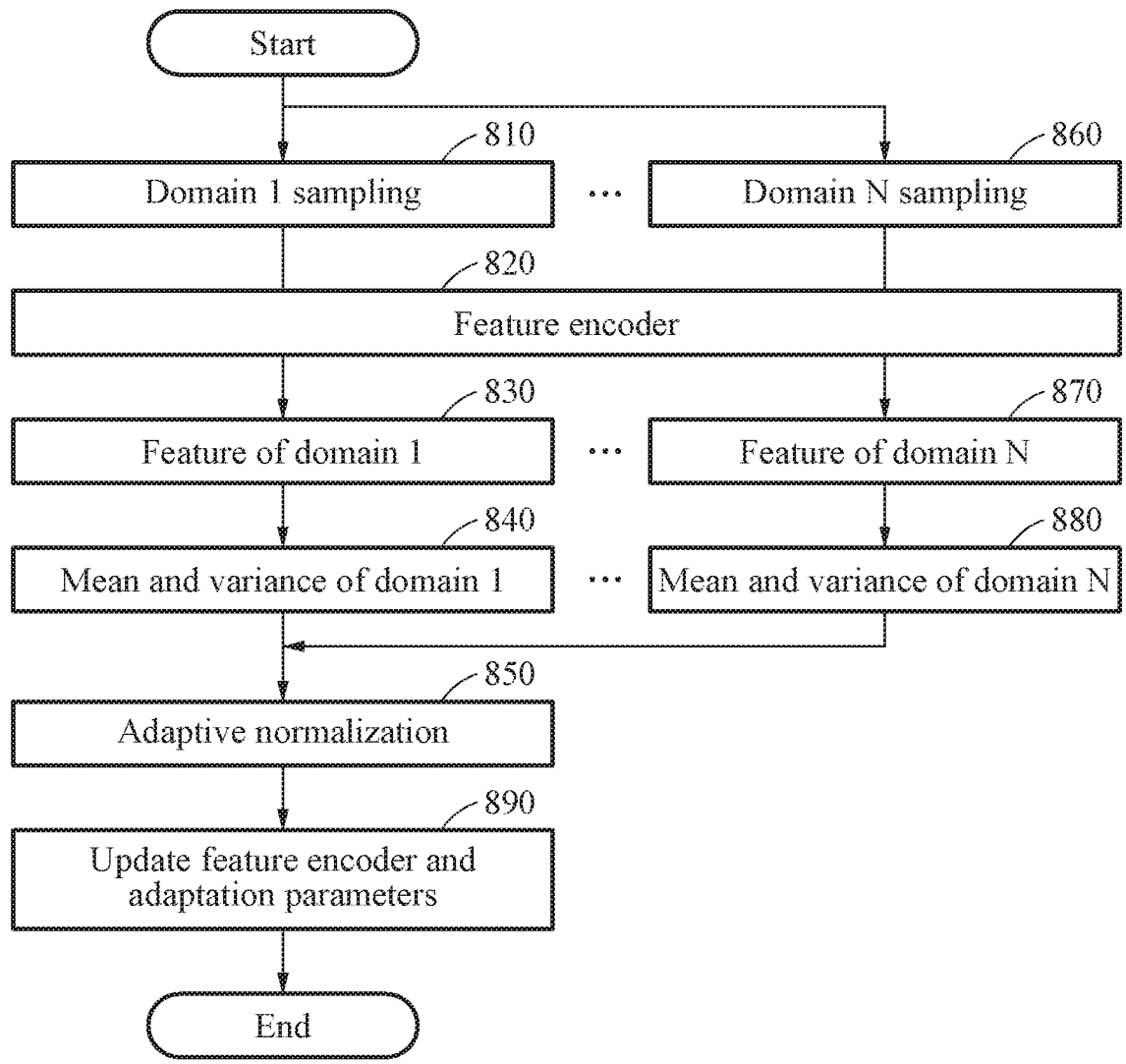
FIG. 8 illustrates an example domain generalization process, in accordance with one or more embodiments.

FIG. 8 illustrates an example domain generalization process, in accordance with one or more embodiments. The operations in FIG. 8 may be performed in the sequence and manner as shown, or may be performed in a sequence or manner that is different from the sequence and manner shown. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, a process of an apparatus performing domain generalization based on data of a plurality of domains is illustrated.

Domain generalization refers to the training of a neural network of the apparatus, and the training of the neural network based on data inputs of a plurality of domains (for example, N domains, N being a natural number greater than "2") and ground truths (GTs) corresponding to the data inputs.

In operations 810 and 860, the apparatus may sample a batch for each domain, with respect to N domains. By inputting the sampled batch for each domain into a feature encoder in operation 820, the apparatus may generate feature(s) for each domain in operations 830 and 870.

In operations 840 and 880, the apparatus may calculate a mean and a variance with respect to each of the feature(s) for each domain. For example, the apparatus may calculate the mean and the variance for each domain using a mean for each domain.

In operation 850, the apparatus performs adaptive normalization for the feature encoder to have a mean and a variance of a predetermined domain, based on the mean and the variance for each domain. In this example, the apparatus performs the adaptive normalization by style matching by the AIN described with reference to FIG. 5. However, a source domain may not be separately provided in the example of FIG. 8. Thus, the apparatus may find a mean and a variance of a domain being a subject to the style matching, through training. That is, the apparatus may perform normalization for each domain, and scale and shift the normalized features identically with respect to all the domains so as to follow a predetermined statistical value. The scaled values and the shifted values correspond to adaptation parameters of the neural network. The adaptation parameters are updated together with the neural network during the training process.

In operation 890, the apparatus updates the feature encoder and the adaptation parameters of the feature encoder based on a result of the adaptive normalization. The apparatus updates the feature encoder and/or the adaptation parameters of the feature encoder by performing training such that differences from the ground truths decrease.

The apparatus may perform the adaptive normalization on all convolutional layers, and may not perform the adaptive normalization on the final layer of the feature encoder. For example, if the convolutional layers are followed by a normalization layer, the operating apparatus may update the feature encoder by updating parameters of the normalization layer.

For example, if batch normalization is used, the apparatus configures a batch for each domain, when configuring batches, and performs the domain generalization thereon. That is because the scale and shift parameters applied for batch normalization are in the form of the adaptation parameters of the feature encoder updated through training.

For example, the apparatus iteratively performs the adaptive normalization, in a manner of performing the entire adaptive normalization process using a feature of first data of the N domains and then sequentially performing the adaptive normalization process again using a feature of subsequent data of the N domains.

After completing the training of the neural network based on the domain generalization, the apparatus performs the adaptive normalization using the trained neural network.

If input data corresponds to data of a domain used to train the neural network, style features such as a mean and a variance of the domain are already known. In this example, the apparatus performs the adaptive normalization using the known style features of the domain.

If the input data corresponds to data of a new domain yet to be used to train the neural network, the apparatus calculates style features by sampling the data of the domain and performs the adaptive normalization using the calculated style features.

For example, in case of on-the-fly where information related to the domain corresponding to the input data is unknown and cannot be sampled in advance, the apparatus considers the input data such as 1 to N images as a domain and performs the adaptive normalization by immediately calculating a mean and a variance.

Figure 9:
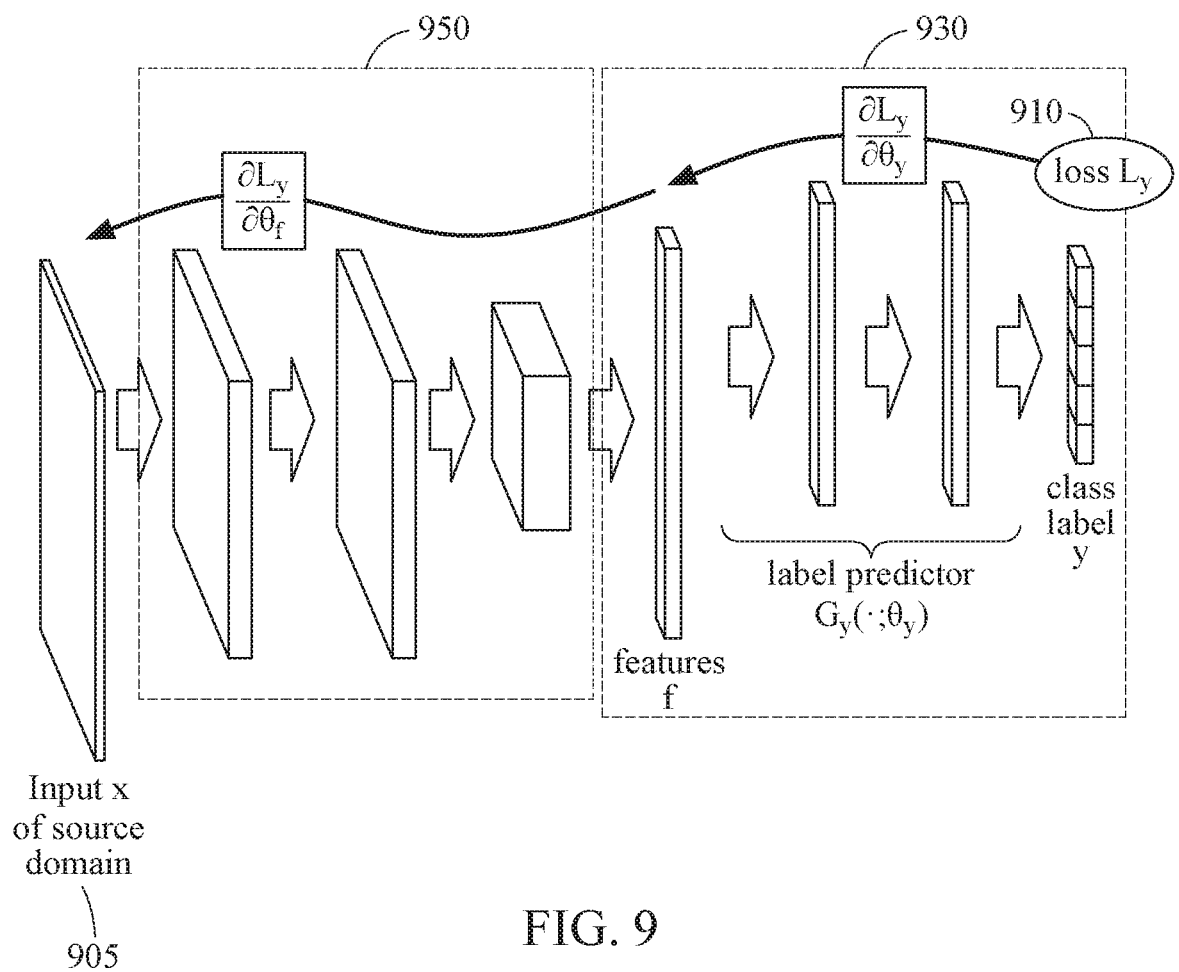
FIG. 9 illustrates an example training process of a neural network based on domain adaptation, in accordance with one or more embodiments.

FIG. 9 illustrates an example training process of a neural network based on domain adaptation, in accordance with one or more embodiments. The training may be performed by any apparatus described herein, e.g., including one or more processors, one or more memories storing instructions that, when executed by the one or more processors, configured the one or more processors to implement the respective operations. Such apparatuses or other apparatuses in various examples, will be referred to as a training apparatus with respect to FIG. 9, for convenience of explanation.

Referring to FIG. 9, a process of training a neural network using data X 905 is illustrated. In the example of FIG. 9, a source domain is not provided separately. Thus, the operating apparatus finds a style feature of a predetermined domain subject to style matching, through training.

A training apparatus may extract a style feature of a predetermined domain from the training data X 905 using a feature encoder 950. The training apparatus may perform domain adaptation of the training data X 905, by style matching of training data based on a representative style feature corresponding to a plurality of domains and the style feature of the predetermined domain.

The training apparatus may output a class label y corresponding to the style-matched training data X 905 using a classifier 930.

The training apparatus may train the classifier 930 and the feature encoder 950 by back-propagation of a difference, that is, a loss $L_y$, 910, between the class label y and a ground truth GT of the training data X 905. The training apparatus trains adaptation parameters of the feature encoder 950 by back-propagation of the loss $L_y$, 910.

Figure 10:
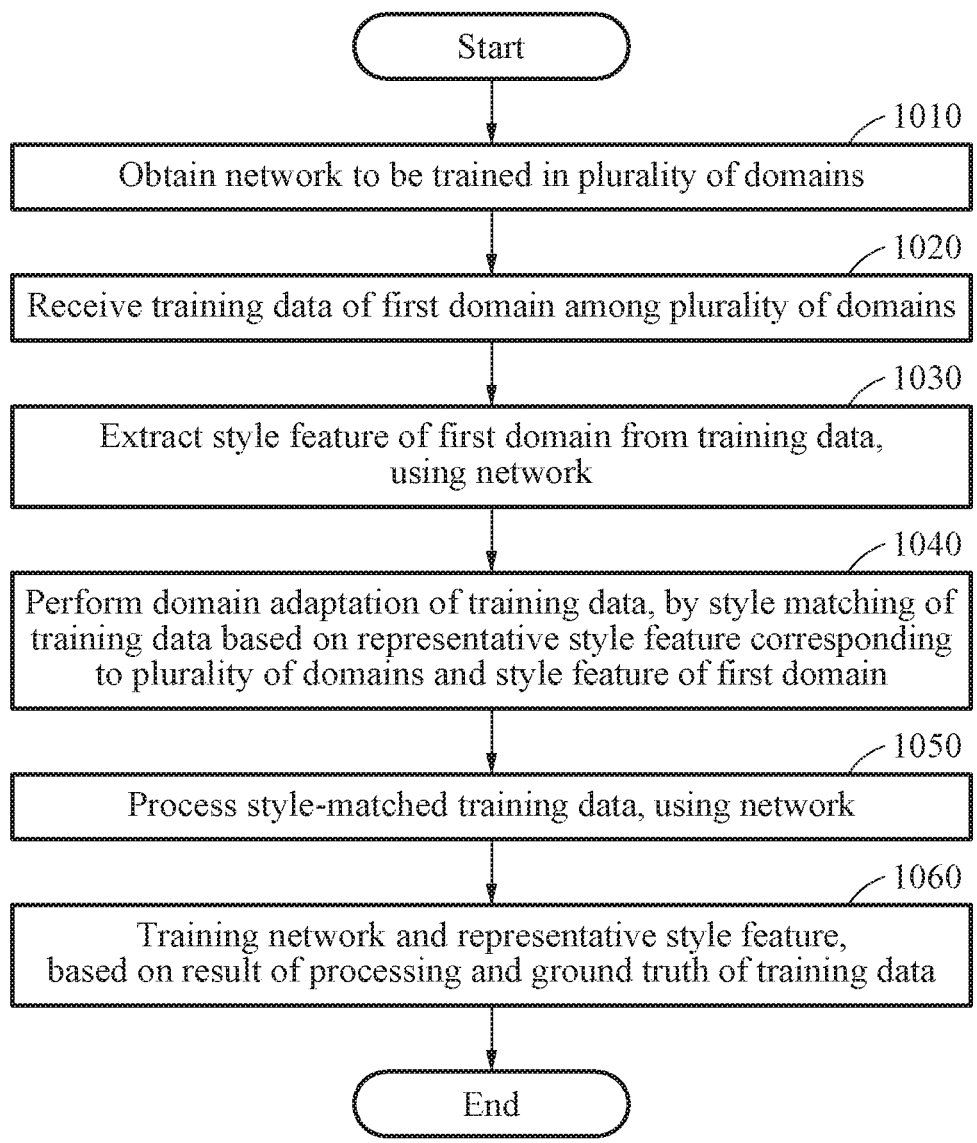
FIG. 10 illustrates an example training method of a neural network based on domain adaptation, in accordance with one or more embodiments.

FIG. 10 illustrates an example training method of a neural network based on domain adaptation, in accordance with one or more embodiments. The operations in FIG. 10 may be performed in the sequence and manner as shown, or may be performed in a sequence or manner that is different from the sequence and manner shown. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, in operation 1010, a training apparatus obtains a neural network to be trained in a plurality of domains. The training may be performed by any apparatus described herein. The training may be performed by any apparatus described herein, e.g., including one or more processors, one or more memories storing instructions that, when executed by the one or more processors, configured the one or more processors to implement the respective operations. Such apparatuses or other apparatuses in various examples, will be referred to as a training apparatus with respect to FIG. 10, for convenience of explanation.

In operation 1020, the training apparatus receives training data of a first domain among the plurality of domains. The training data may include, as non-limiting examples, speech data, image data, and biometric signal data.

In operation 1030, the training apparatus extracts a style feature of the first domain from the training data, using the neural network. For example, the training apparatus extracts style information corresponding to the training data from at least one of a plurality of layers included in the neural network. The training apparatus determines the style feature of the first domain based on the style information. Further, the training apparatus extracts features corresponding to the plurality of layers included in the neural network by applying the training data of the first domain to the neural network, and extracts the style feature of the first domain by calculating a statistical value of the features.

In operation 1040, the training apparatus performs domain adaptation of the training data, by performing style matching of the training data based on a representative style feature corresponding to the plurality of domains and the style feature of the first domain. For example, the training apparatus performs style matching of the style feature of the first domain with the representative style feature. In this example, the representative style feature may include a mean and a variance of values output from a plurality of nodes included in a corresponding layer. The training apparatus performs the style matching of the style feature of the first domain to the representative style feature by AIN, based on the representative style feature and the style feature of the first domain.

In operation 1050, the training apparatus processes the style-matched training data, using the neural network. The training apparatus performs a predetermined desired operation of the neural network using the style-matched training data. The desired operation includes, for example, image recognition, speech recognition, biometric signal recognition, and image segmentation.

In operation 1060, the training apparatus trains the neural network and the representative style feature, based on a result of the processing and the ground truth of the training data. The training apparatus trains the neural network and the representative style feature based on a loss calculated based on the result of the processing and the ground truth of the training data. The training apparatus trains the neural network and the representative style feature to minimize the loss corresponding to a difference between the result of the processing and the ground truth of the training data.

Figure 11:
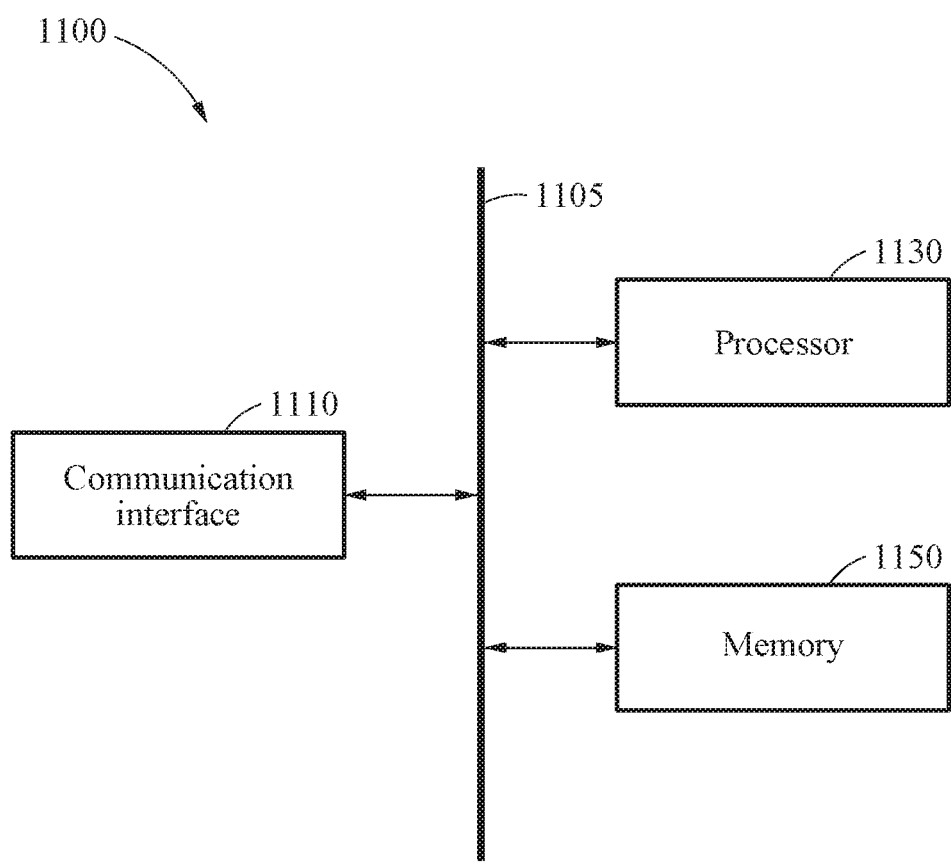
FIG. 11 illustrates an example operating apparatus of a neural network based on domain adaptation, in accordance with one or more embodiments.

FIG. 11 illustrates an example apparatus with a neural network based on domain adaptation, in accordance with one or more embodiments.

Referring to FIG. 11, an apparatus 1100 with a neural network based on domain adaptation (hereinafter, the "operating apparatus") includes the communication interface 1110 and a processor 1130. The operating apparatus 1100 further includes the memory 1150. The communication interface 1110, the processor 1130, and the memory 1150 communicate with each other through a communication bus 1105.

The memory 1150 may include computer-readable instructions. The processor 1130 may be configured to implement any combination, or all of the above-described operations depending on the instructions in the memory 1150 being executed by the processor 1130, for example. The memory 1150 may be a volatile memory or a non-volatile memory, or may include one or more volatile memories and/or one or more non-volatile memories. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the storage device 820 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The processor 1130 may be a single processor or one or more processors, and is a hardware device, or a combination of hardware and instructions which configure the processor 1130 based on execution of the instructions by the processor 1130. The processor 1130 may be further configured to execute other instructions, applications, or programs, or configured to control other operations of the operating apparatus 1100. The processor 1130 includes, for example, a central processing unit (CPU), graphics processing unit (GPU), and/or other processor configured for implementing machine learning models. The operating apparatus 1100 may include, or be connected to an external device for example, a camera or personal computer as non-limiting examples, through the communication interface 1110, to receive or capture an input image. The operating apparatus 1100 may be, or implemented as part of, various computing devices, for example, a smartphone, a wearable device, a personal digital assistant (PDA), a tablet computer, a laptop computer, a smart home appliance such as a smart television, a smart car, a camera, and a kiosk. In addition, the operating apparatus 1100 may be configured to perform all operations described above.

The communication interface 1110 receives a first style feature of a source domain and input data of a target domain. In an example, the communication interface 1110 may be a display that receives an input from a user, or that provides an output. In an example, the communication interface 1110 may function as an input device, and may capture or receive an input from a user through an input method, for example, a voice input. Thus, the communication interface 1110 may include, as non-limiting examples, a microphone, and other devices that may detect an input from a user and transmit the detected input to the processor 920.

The processor 1130 extracts a second style feature of the target domain from the input data using a neural network already trained in the source domain. The processor 1130 performs domain adaptation of the input data, by style matching of the input data based on the first style feature and the second style feature. The processor 1130 processes the style-matched input data using the neural network.

The memory 1150 stores the first style feature of the source domain and the input data of the target domain received by the communication interface 1110. Further, the memory 1150 stores the second style feature of the target domain extracted by the processor 1130, and a result of performing domain adaptation of the input data by style matching. In addition, the memory 1150 stores a result of processing the style-matched input data by the processor 1130 using the neural network.

Further, the processor 1130 performs one or more, or all operations or methods described with reference to FIGS. 1 through 8 representing respective algorithms. The processor 1130 is a data processing device implemented by hardware including a circuit having a physical structure to perform desired operations. For example, the desired operations include such aforementioned instructions or codes. For example, the hardware-implemented data processing device includes a microprocessor, a central processing unit (CPU), a processor core, a multi-core processor, a multiprocessor, an application-specific integrated circuit (ASIC), and a field-programmable gate array (FPGA).

The processor 1130 executes instructions and controls the operating apparatus 1100.

The memory 1150 stores a variety of information generated during the processing process of the processor 1130. In addition, the memory 1150 stores a variety of data and programs. The memory 1150 may include a high-capacity storage medium such as a hard disk to store the variety of data.

The operating apparatus, training apparatus, encoder, decoder, operating apparatus 1100, communication interface 1110, processor 1130, memory 1150, and other apparatuses, units, modules, devices, and other components described herein with respect to FIGS. 1-11 are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
   obtaining a neural network pre-trained in a source domain and a first style feature of the source domain;
   extracting a second style feature of a target domain from received input data of the target domain, using the neural network;
   performing domain adaptation of the input data, by performing style matching of the input data based on the first style feature of the source domain and the second style feature of the target domain; and
   generating an inference result by processing the style-matched input data using the neural network,
   wherein the source domain includes a plurality of domains, and
   wherein the first style feature of the source domain includes a third statistical value that is calculated based on first features extracted by applying batches sampled for each label of the plurality of domains to the neural network.

2. The method of claim 1, wherein the extracting comprises:
   extracting style information corresponding to the input data from at least one of a plurality of layers included in the neural network; and
   determining the second style feature of the domain target based on the style information.

3. The method of claim 2, wherein the performing of the domain adaptation comprises performing style matching of the style information corresponding to the second style feature of the target domain with the first style feature of the source domain.

4. The method of claim 3, wherein the style information includes a mean and a variance of values output from a plurality of nodes included in a corresponding layer.

5. The method of claim 4, wherein the performing of the domain adaptation comprises performing style matching of the style information to the first style feature of the source domain by adaptive instance normalization (AIN), based on the first style feature of the source domain and the second style feature of the target domain.

6. The method of claim 3, wherein the style information includes a mean and a covariance of values output from a plurality of nodes included in a corresponding layer.

7. The method of claim 6, wherein the performing of the domain adaptation comprises performing the style matching of the style information to the first style feature of the source domain by a whitening and coloring transform (WCT) process, based on the first style feature of the source domain and the second style feature of the target domain.

8. The method of claim 1, wherein the performing of the domain adaptation comprises:
   determining, in response to a receipt of plural input data including the input data, a representative style feature of second style features extracted from the plurality of received input data; and
   performing the domain adaptation of the input data, by style matching of the plural input data based on the first style feature of the source domain and the representative style feature.

9. The method of claim 1, wherein the extracting of the second style feature comprises:
   sampling the received input data;
   extracting second features corresponding to a plurality of layers included in the neural network by applying the sampled received input data to the neural network; and
   extracting the second style feature by calculating a second statistical value of the extracted second features.

10. The method of claim 1, wherein the first style feature of the source domain includes a first statistical value that is calculated based on first features extracted by applying sampled data of the source domain to the neural network.

11. The method of claim 1, wherein the neural network is configured to perform a desired predetermined operation, and
    the desired predetermined operation comprises any one or any combination of image recognition, speech recognition, biometric signal recognition, and image segmentation.

12. The method of claim 1, wherein the received input data includes any one or any combination of speech data, image data, and biometric signal data.

13. A non-transitory computer-readable storage medium storing instructions that, when executed by a processor, cause the processor to perform the operating method of claim 1.

14. The method of claim 1, further comprising training the neural network based on one or any combination of speech data, image data, and biometric signal data.

15. A processor-implemented neural network method, the training method comprising:
obtaining a neural network to be trained in a plurality of domains;
extracting a style feature of the first domain from training data of a first domain among the plurality of domains, using the neural network;
performing domain adaptation of the training data, by performing style matching of the training data based on a representative style feature corresponding to the plurality of domains and the style feature of the first domain;
processing the style-matched training data, using the neural network; and
training the neural network and the representative style feature, based on a result of the processing and a ground truth of the training data,
wherein the style feature of the first domain includes a third statistical value that is calculated based on first features extracted by applying batches sampled for each label of the plurality of domains to the neural network.

16. The method of claim 15, wherein the extracting comprises:
extracting style information corresponding to the training data from at least one of a plurality of layers included in the neural network; and
determining the style feature of the first domain based on the style information.

17. The method of claim 16, wherein the performing of the domain adaptation comprises performing style matching of the style feature of the first domain with the representative style feature.

18. The method of claim 15, wherein the representative style feature includes a mean and a variance of values output from a plurality of nodes included in a corresponding layer.

19. The method of claim 18, wherein the performing of the domain adaptation comprises performing style matching of the style feature of the first domain to the representative style feature by adaptive instance normalization (AIN), based on the representative style feature and the style feature of the first domain.

20. The method of claim 16, wherein the extracting of the style feature of the first domain comprises:
extracting features corresponding to a plurality of layers included in the neural network by applying the training data of the first domain to the neural network; and
extracting the style feature of the first domain by calculating a statistical value of the features.

21. The method of claim 15, wherein the processing of the style-matched training data comprises performing a desired predetermined operation of the neural network with the style-matched training data.

22. The method of claim 21, wherein the desired predetermined operation includes any one or any combination of image recognition, speech recognition, biometric signal recognition, and image segmentation.

23. The method of claim 15, wherein the training comprises training the neural network and the representative style feature based on a loss calculated based on the result of the processing and the ground truth of the training data.

24. The method of claim 15, wherein the training data includes any one or any combination of speech data, image data, and biometric signal data.

25. A neural network apparatus comprising:
a processor configured to extract a second style feature of a target domain from input data of the target domain, using a neural network pre-trained in a source domain, perform domain adaptation of the input data, by style matching of the input data based on a first style feature of the first source domain and the second style feature, and process the style-matched input data, using the neural network,
wherein the source domain includes a plurality of domains, and
wherein the first style feature of the source domain includes a third statistical value that is calculated based on first features extracted by applying batches sampled for each label of the plurality of domains to the neural network.

26. The apparatus of claim 25, wherein the processor is further configured to:
extract style information corresponding to the input data from at least one of a plurality of layers of the neural network, and
determine the second style feature of the target domain based on the style information.

27. The apparatus of claim 26, wherein the processor is further configured to perform style matching of the style information corresponding to the second style feature of the target domain with the first style feature of the source domain.

28. The apparatus of claim 27, wherein the style information includes a mean and a variance of values output from a plurality of nodes included in a corresponding layer of the neural network.

29. The apparatus of claim 28, wherein the processor is further configured to perform style matching of the style information to the first style feature of the source domain by adaptive instance normalization (AIN), based on the first style feature of the source domain and the second style feature of the target domain.

30. The apparatus of claim 27, wherein the style information includes a mean and a covariance of values output from a plurality of nodes included in a corresponding layer.

31. The apparatus of claim 30, wherein the processor is further configured to perform style matching of the style information to the first style feature of the source domain by whitening and coloring transform (WCT), based on the first style feature of the source domain and the second style feature of the target domain.

32. The apparatus of claim 25, wherein the processor is further configured to:
determine, in response to receipt of plural input data including the input data, a representative style feature of second style features extracted from the plural input data, and
perform the domain adaptation of the plural input data, by style matching of the input data based on the first style feature of the source domain and the representative style feature.

33. The apparatus of claim 25, wherein the processor is further configured to:
sample the input data,
extract second features corresponding to a plurality of layers of the neural network by applying the sampled input data to the neural network, and
extract the second style feature by calculating a second statistical value of the second extracted features.

34. The apparatus of claim 25, wherein the first style feature of the source domain includes a first statistical value that is calculated based on first features extracted by applying sampled data of the source domain to the neural network.

35. The apparatus of claim 25, wherein the neural network is configured to perform a desired predetermined operation, and
the desired predetermined operation includes any one or any combination of image recognition, speech recognition, biometric signal recognition, and image segmentation.

36. The apparatus of claim 25, wherein the input data comprises any one or any combination of speech data, image data, and biometric signal data.

37. The apparatus of claim 25, further comprising an interface configured to receive a first style feature of a source domain and input data of a target domain.

38. A processor-implemented neural network method comprising:
extracting a style feature of a predetermined domain from training data using a feature encoder;
performing domain adaptation of the training data by performing style matching of the training data based on a representative style feature corresponding to a plurality of domains and the style feature of the predetermined domain; and
training the neural network and the representative style feature based on a calculated loss and a ground truth of the training data,
wherein the style feature of the predetermined domain includes a statistical value that is calculated based on first features extracted by applying batches sampled for each label of the plurality of domains to the neural network.

39. The method of claim 38, wherein the training data comprises one or more of speech data, image data, and biometric signal data.

40. The method of claim 38, further comprising performing the style matching of the style feature of the predetermined domain with the representative style feature by adaptive instance normalization (AIN), based on the representative style feature and the style feature of the predetermined domain.

41. The method of claim 38, wherein the domain adaptation is performed without retraining of one or more portions of the neural network.

42. A processor-implemented method comprising:
receiving a target domain image;
extracting a style feature of the target domain from the received target domain image;
matching the extracted style feature of the target domain with a feature of a source domain; and
outputting a result of the matching,
wherein the source domain includes a plurality of domains, and
wherein a first style feature of the source domain includes a statistical value that is calculated based on first features extracted by applying batches sampled for each label of the plurality of domains to a neural network.

43. The method of claim 42, further comprising extracting the style feature of the target domain using a neural network that has been pre-trained in the source domain.

44. The method of claim 42, wherein the matching comprises removing the style feature of the target domain from the target domain image, and adding the style feature of the source domain to the target domain.

* * * * *